May 26, 1959 P. A. BURNHAM 2,888,295
CABLE GRIPPING AND PULLING DEVICE
Filed March 13, 1958 5 Sheets-Sheet 1

INVENTOR.
PHILIP A. BURNHAM
BY
His Attorney

May 26, 1959  P. A. BURNHAM  2,888,295
CABLE GRIPPING AND PULLING DEVICE
Filed March 13, 1958  5 Sheets-Sheet 4

INVENTOR.
Philip A. Burnham
ECKHOFF & SLICK
ATTORNEYS
BY
A MEMBER OF THE FIRM

May 26, 1959 P. A. BURNHAM 2,888,295
CABLE GRIPPING AND PULLING DEVICE
Filed March 13, 1958 5 Sheets-Sheet 5

INVENTOR.
Philip A. Burnham
ECKHOFF & SLICK
ATTORNEYS

United States Patent Office 2,888,295
Patented May 26, 1959

2,888,295

CABLE GRIPPING AND PULLING DEVICE

Philip A. Burnham, Sacramento, Calif.

Application March 13, 1958, Serial No. 722,115

12 Claims. (Cl. 294—86)

This is a continuation-in-part of my application, Serial No. 572,540, filed March 19, 1956, and now abandoned.

This invention relates to devices used for grasping, retaining and pulling of wire rope, cable or the like, and to such an item known in the trade as a "come-along."

An object of the present invention is to provide a device of the character described which will afford a strong, powerful grip aligned with the pulling force and wherein the grip is effected by a pair of jaws which are constantly oriented parallel to the axis of the cable and applied perpendicular to the cable to carefully, most effectively and firmly hold the cable without gouging, distorting, stripping or otherwise damaging the wire or a protective coating as may be applied thereto.

Another object of the present invention is to provide a come-along of the character above which will have a relatively large magnitude of opening and closing movement of the jaws to thus accommodate a greater range in wire sizes and to enable a lesser number of standard sizes of come-alongs to cover the whole usable range of wire sizes, and wherein in each tool size the jaws will apply a uniform full holding force throughout the full range of wire sizes covered by the tool.

A further object of the present invention is to provide a come-along of the character described which is compact, relatively light in weight and easily and readily applied, and which may with equal ease and facility be released from the cable without sticking, jamming or freezing of the mechanism.

Still another object of the present invention is to provide a come-along of the character above which is adapted for use with all existing types of wire and cable, including steel-clad, copper-clad and galvanized steel, aluminum, etc., and which is completely dependable for installing guy wires, span wires, messenger wires and the like, where strong pull is required without slippage of the tool on the wire as would cause damage to the galvanizing or other plating and consequent premature weathering, rusting or deterioration of the wire at the point of damage.

A still further object of the present invention is to provide a come-along of the character above which is designed for simple and easy dismantling and repair in the field and renewal of parts so that the tool may be readily maintained in good repair and service over a long and useful life at a low cost.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawings:

Figure 10 is a view from the back of the device with portions broken away to illustrate the construction.

Figure 1:
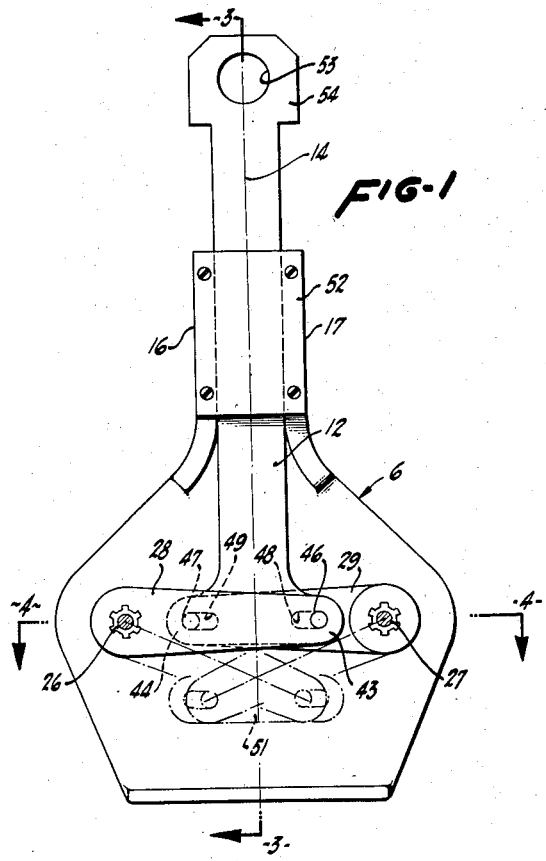
Figure 1 is a rear elevation of a cable gripping and pulling device constructed in accordance with the present invention and shown with the handle portion removed.

The cable gripping and pulling device of the present invention and as illustrated in the accompanying drawing consists, briefly, of a support 6, here a housing, a pair of jaws 7 and 8 having opposed cable gripping faces 9 and 10 and which are mounted on the support 6 for relative movement perpendicular to the length of the faces between cable gripping and cable releasing positions; a pull member 12 carried by the support for longitudinal reciprocation parallel to the faces 9 and 10 and between relatively extended and retracted positions shown in full and dotted lines, respectively, in Figure 1; and rack and pinion means 13 connecting the pull member 12 and at least one of the jaws for causing movement of the jaws to cable gripping and cable releasing positions upon movement of the pull member to extended and retracted positions, respectively.

Figure 2:
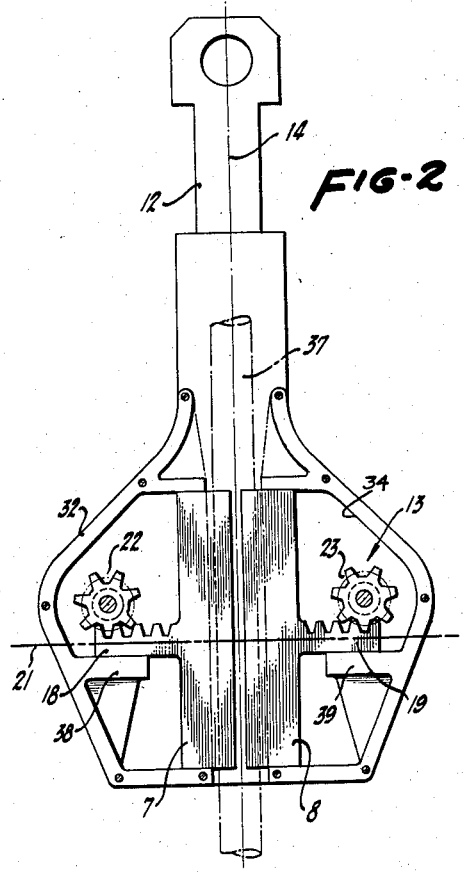
Figure 2 is a front elevation of the device illustrated in Figure 1, but with the cover plates removed to show the interior parts.

As will be best seen in Figures 1 and 2, the jaws 7 and 8 are each mounted for transverse reciprocation to and from a medially disposed longitudinal axis denoted by center line 14, and the pull member 12 is supported between side guide flanges 16 and 17 provided by the support 6 for longitudinal reciprocation on the axis 14 so that the axis of pull is substantially coincident with the axis of gripping action with all of the forces applied symmetrically to the longitudinal center plane of the device, without material twist, angularity or offset.

Uniform and joint transverse reciprocation of the jaws 7 and 8 is here obtained by effecting their movement by individual rack and pinion means actuated in common by the pull member 12. Accordingly the jaws 7 and 8, which are here of elongated form as seen in Figure 2, are provided with racks 18 and 19 which are located medially of the length of the jaws and project perpendicularly therefrom away from the faces 9 and 10 and the central axis 14, thus positioning the racks for reciprocation on a common transverse axis, denoted by line 21 in Figure 2. A pair of pinions 22 and 23 are enmeshed with the racks and are provided with shafts 26 and 27 which are journalled for rotation by the support 6 in substantially equally spaced relation on opposite sides of the longitudinal axis 14 and are here rotated by lever arms 28 and 29 secured to the shafts 26 and 27 and which extend therefrom towards the longitudinal axis 14 for connection to the pull member 12. This general arrangement aids in attaining a desired compactness of the tool and also in affording torque multiplying means connecting the pull member and the pinions so as to apply adequate gripping pressure to the jaws 7 and 8.

The support 6 is preferably in the form of a banjo-shaped housing, as seen in the drawing, having bottom, side and top walls 31, 32 and 33 defining an interior chamber 34 for housing the pinions 22 and 23 and jaws 7 and 8 and their racks 18 and 19. The top wall 33 is here provided by cover plates suitably divided to provide a longitudinally extending cable receiving opening 36 on the center line plane 14 so as to admit a cable 37 into the interior chamber 34 for engagement between the jaw faces 9 and 10. Interior shoulders 38 and 39 provided in the housing here support the racks 18 and 19 for transverse sliding reciprocation.

The pinion shafts 26 and 27 are conveniently journaled in bearing openings provided in the bottom wall 31 of the housing and project therefrom for splining onto boss-shaped ends 41 and 42 of lever arms 28 and 29. The opposite ends 43 and 44 of the lever arms are provided with pins 46 and 47 which engage in elongated cross-slots 48 and 49 provided in an enlarged interior end 51 of the pull member 12. The latter assembly, seen in Figure 1, is here fashioned as an elongated strap or pull-bar which is fitted for sliding reciprocation between the guide flanges 16 and 17 and held therebetween by a cover plate 52, and is formed with an opening 53 at its opposite end 54 for attachment to a winch, cable or the like. The longitudinal reciprocation of the pull member 12 is translated by slots 48 and 49 and pins 46 and 47 to a rotary displacement of lever arms 28 and 29 and consequently rotary displacement of pinions 22 and 23 and transverse reciprocation of racks 18 and 19 and jaws 7 and 8.

Figure 3:
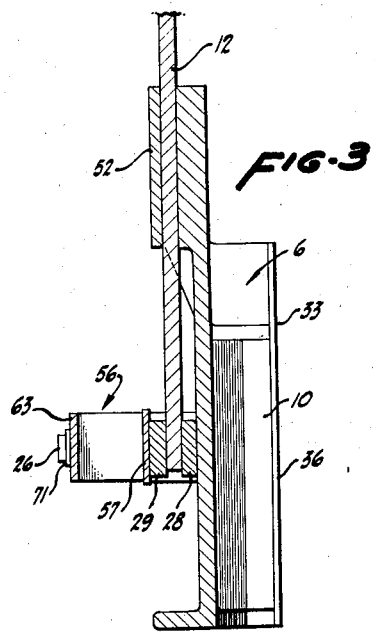
Figure 3 is a longitudinal cross-sectional view of the device taken substantially on the plane of line 3—3 of Figure 1.
Figure 4:
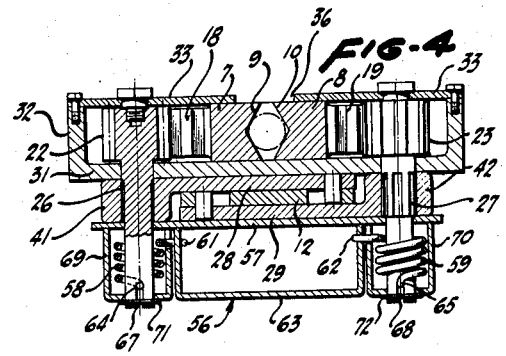
Figure 4 is a transverse cross-sectional view of the device taken substanially on the plane of line 4—4 of Figure 1.

Preferably, spring means is provided for normally biasing the jaws 7 and 8 to cable engaging position and the pull member to extended position. In the present embodiment, this feature is conveniently coordinated with the further desirable feature of a carrying handle 56. As will be best seen from Figures 3 and 4, the pinion shafts 26 and 27 are extended outwardly from the lever arm bosses 41 and 42. The handle member 56 is provided with a base strap 57 which is formed with openings engageable over the shafts 26 and 27. Surrounding the shafts 26 and 27 to the outside of the strap 57 are helical springs 58 and 59, which here have one end 61 and 62 anchored to the legs of a U-shaped bracket 63 forming part of the handle. The opposite (outer) spring ends 64 and 65 are here anchored in cross-slots 67 and 68 provided in the outer ends of the shafts 26 and 27. Spring housings 69 and 70 are mounted over the shaft ends and around the springs to complete the assembly and are held in place by cross pins 71 and 72 inserted through the outer ends of the shafts, and across the outer ends of the housings, as seen in Figure 4.

In the use of the device, the pull member 12 is moved to its retracted position, as indicated in dotted lines in Figure 1, so as to displace the jaws 7 and 8 to their open position. The cable or wire 37 to be pulled is then inserted into the center opening 36 and between the jaws, following which the pull member 12 is displaced longitudinally (outwardly as seen in Figures 1 and 2) so as to draw the jaws up firmly against the opposite sides of the wire. Further pulling on the member 12 will apply further clamping pressure to the wire 37, the clamping pressure being proportional to the amount of pull. It is important to note that the jaws 7 and 8 are of elongated form and lie directly alongside of and parallel to the wire 37 and are applied to the wire in a direction which is at all times perpendicular to the length of the wire. Also, as will be seen in Figure 4, the jaw faces 9 and 10 are preferably of V-shaped cross section so as to most effectively grip the wire. The combination as described will apply a strong, powerful gripping action without danger of the device sliding on the wire, and without longitudinal digging of the jaws into the wire, or other gouging, distorting or damaging of the wire. The rack and pinion means, coupled with a short stroke of pull member 12, affords relatively large magnitude of opening and closing of the jaws, with a substantially uniform, full holding force applied throughout the range of wire sizes for which the tool is designed. Finally, the parallel opposed moving arrangement of the jaws and their rack and pinion actuation permit easy releasing of the device from the wire by moving the pull member to its relatively retracted position, and this release will be effected without jamming, sticking or freezing of the mechanism.

The device shown in Figures 5-10 is much like that as shown in Figures 1-4 and those numerals which are common have been used to designate like parts. Some differences do exist, however, and these will be pointed out in detail.

To facilitate placing of the device in position with a cable passing through the opening 36 and between the jaws 7 and 8, the pull member 12 is mounted to pass through an extension 71 on the support 6. A spring 72 is mounted about the pull member 12, one end of the spring fitting within a receptacle 73 provided in the extension 71 and resting upon shoulder 74 while the other end of the spring bears against the eye 76-A provided on the end of the pull member. The spring biases the pull member into the extended dotted line position in Figure 5 in which the jaws are in abutment with one another. Providing the spring about the pull member 12 enables a heavier spring to be used and also enables its force to be multiplied in application.

Figure 5:
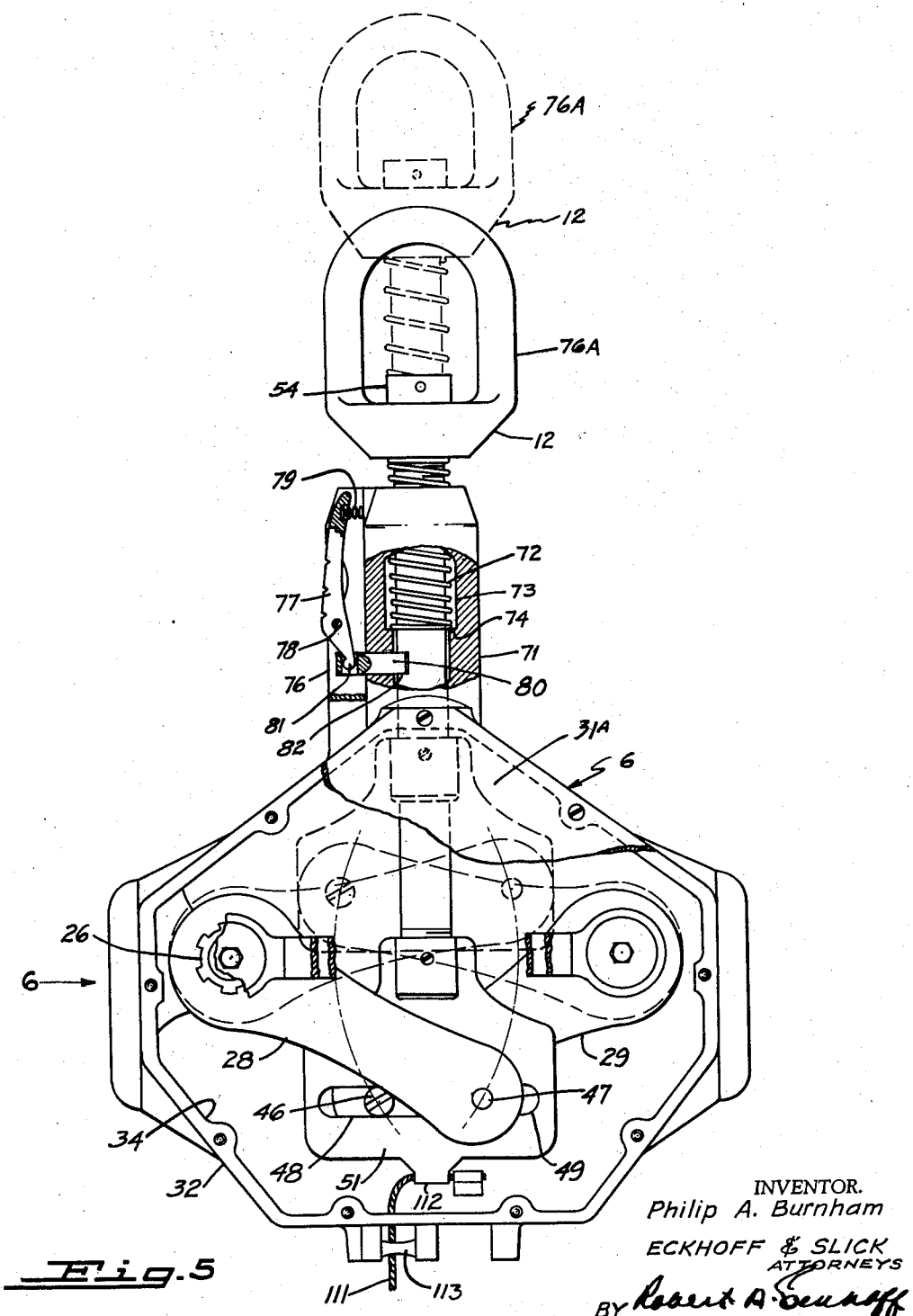
Figure 5 is a rear view, partly in section, showing the rear of a modified form of cable gripping and pulling device.
Figure 6:
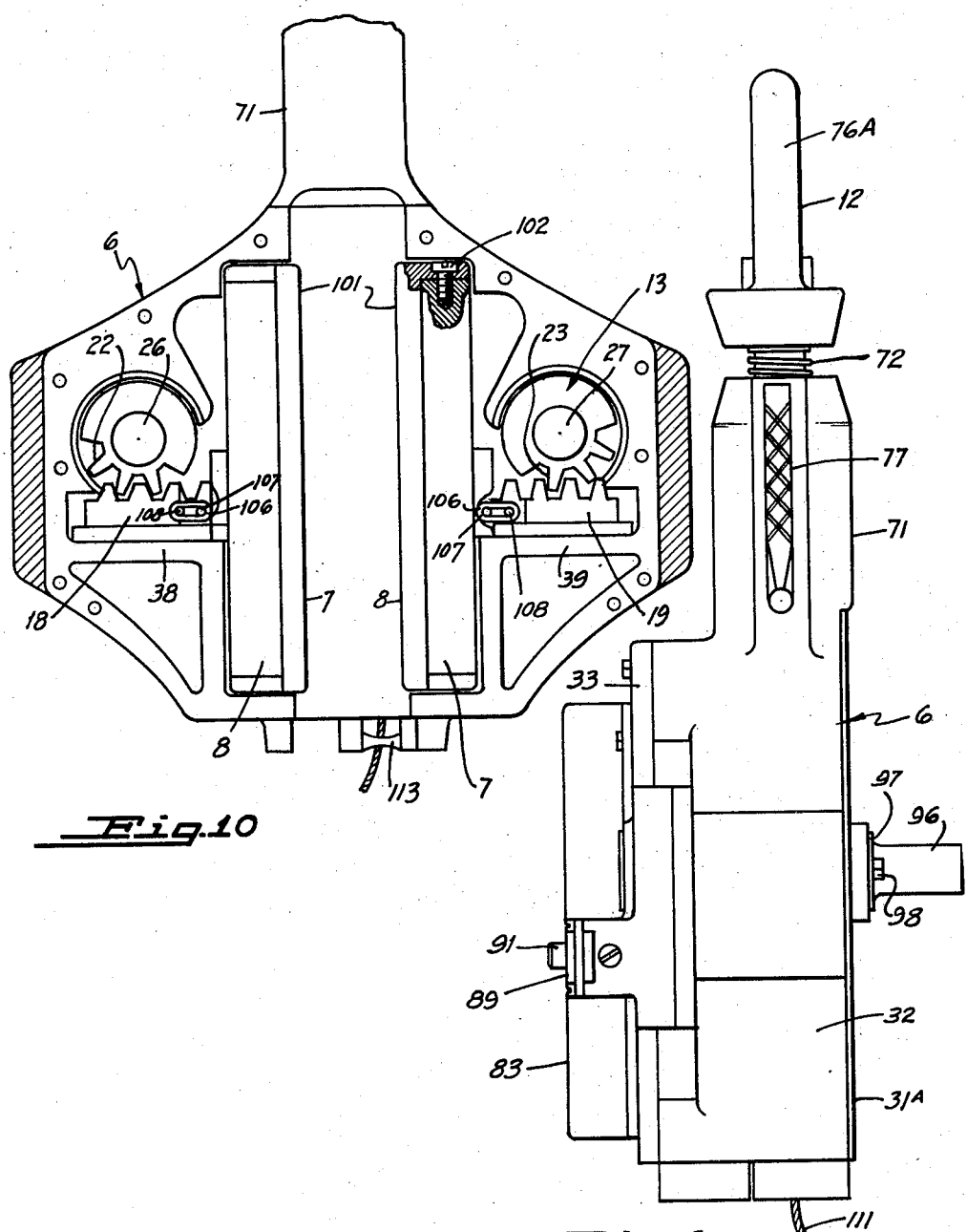
Figure 6 is a side view, showing the modified device of Figure 5.
Figure 7:
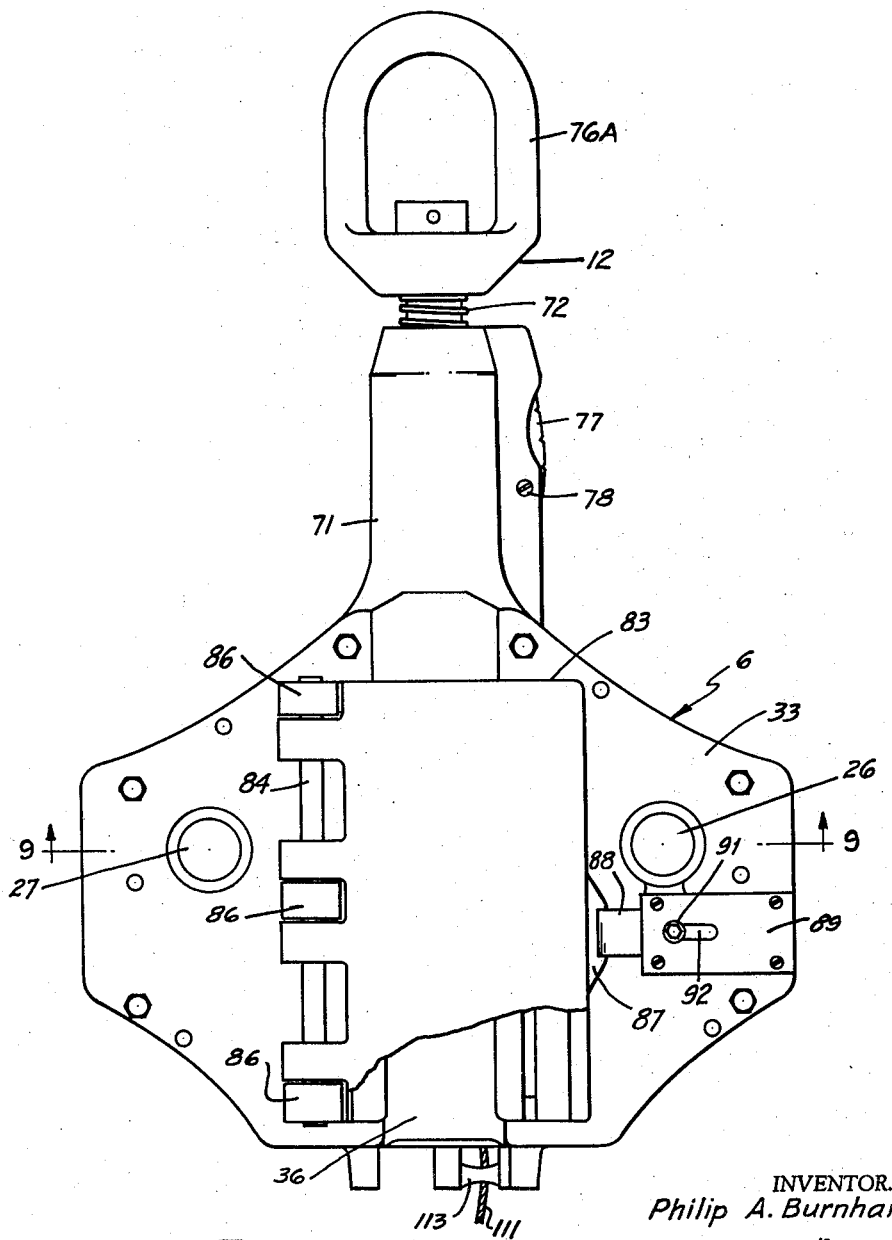
Figure 7 is a front view of the modified device.
Figure 9:
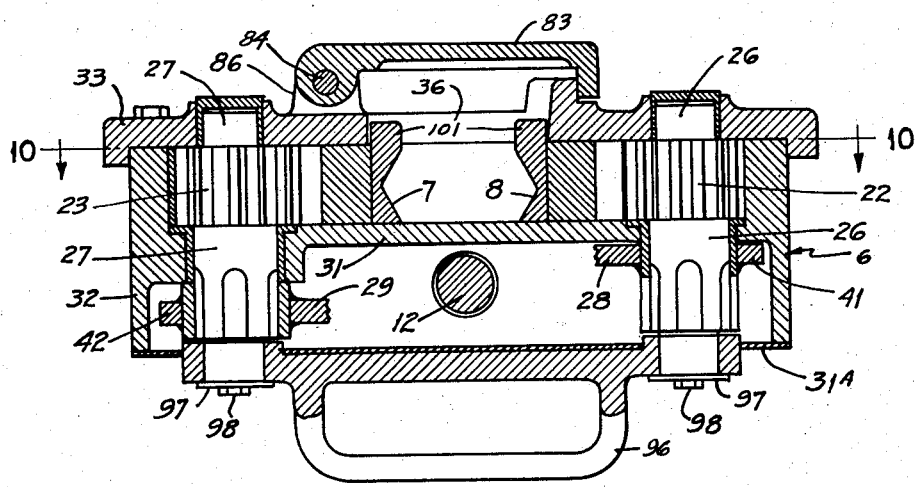
Figure 9 is a section taken through the device along the line 9—9 in Figure 7.
Figure 8:
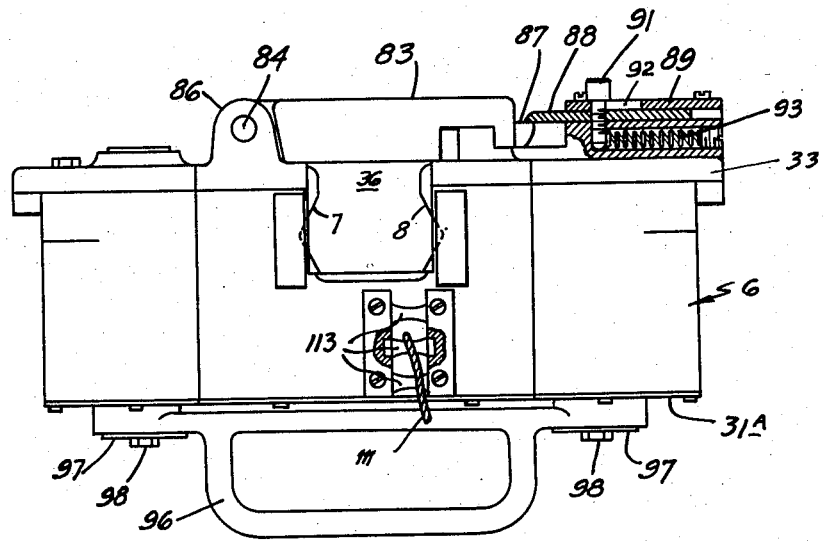
Figure 8 is an end view, partly in section, of the modified device.

Means are provided for latching the device with the jaws in open position and with member 12 extended. The extension 71 includes a slot 76 provided on one side thereof in which is mounted a lever 77, the latter being pivoted as at 78 and biased by spring 79 counterclockwise in Figure 5. A pin 80 is mounted on an end of lever 77, the pin sliding in a passage in extension 71 to engage a notch 82 provided in the sidewall of the pull member 12 to latch the latter in full line position, as shown in Figure 5, and in which the jaws 7 and 8 are spread apart so that a wire may be inserted readily. Several sets of jaws may be provided so that many sizes of wire can be handled. When the latch is released, the spring moves member 12 to extended position and the jaws are forced into position cable engagement, thus facilitating positioning of the device in position for cable pulling.

To provide lateral rigidity to the upper side of support 6 and maintain shafts 26 and 27 in alignment, a cover 83 is mounted upon the support over the opening 36, the cover being hinged upon a rod 84 which extends through several supports 86 provided upon the top wall 33. On its opposite side, the cover includes a tongue 87 which is engaged by a movable latch bar 88. The latch bar is slidably supported in a housing 89 mounted upon the cover plate 33. The latch bar is manipulated by a screw 91 which extends through a slot 92 in the top of housing 89. Spring 93 bears against the screw and so biases the latch bar 88 into a position in which it retains the cover closed with the latch bar engaged with the tongue 87.

On its underside, additional lateral stability for the support 6 and the shafts 26—27 is provided by mounting a handle 96 upon each of the shafts 26 and 27, the handle being removably retained in place by washers 97 and studs 98 engaged with an end of each shaft. Gears 22 and 23 are provided with only a minimum of teeth so that the remainder acts as a support with the adjacent housing.

To permit of the use of different size jaws or the ready replacement of these if they become damaged, it is preferred to provide the jaws 7 and 8 with removable faces 101 which are retained in place by any suitable means such as screws 102 provided at each end and mounting the faces 101 on each of the jaws 7 and 8; in place of the screws 102, one can use spring-pressed balls, each ball fitting into a receptacle at the end of the jaw. Jaw faces 101 may be made of metal faced with an elastomer, such as neoprene, vulcanized to the jaw. The jaws can have any suitable contour, such as a V or a cylindrical form in section.

To permit the jaws to be removed and replaced, each jaw is connected by links 106 extended between a pin 107 on the jaw and a pin 108 on the racks 18—19. The pin and link connection between each rack and each jaw permits the latter to move slightly so that any misalignment between a jaw and the engaged wire is corrected.

Since the cable pulling device may reach a location where it cannot be moved manually and from which the only practical return is in a direction opposite to that in which it was moved during its cable pulling operation, means are provided for releasing the device from its gripping position and for returning the device back along the path which it has traversed. To this end, a cable 111 is attached at 112 to the plate 51 on the end of the pull member 12. The cable 111 passes out of the support 6 between spaced rollers 113. A pull on the cable 111 serves to release the jaw tension to an extent sufficient to enable the device to be slid along the wire which it has been employed to pull into position. The cable 111 also enables one to pull the device along the wire, once jaw tension is released.

I claim:

1. A cable gripping and pulling device comprising: a support, a pair of jaws carried by said support for transverse reciprocation to and from a medially disposed longitudinal axis between cable gripping and cable releasing positions, a pull member carried by said support for longitudinal reciprocation on said axis between relatively extended and retracted positions, a rack fixed to each of said jaws and projecting therefrom perpendicularly to said axis, a pinion journaled by said support and enmeshed with each of said racks, and torque multiplying means connecting said pull member and pinions and causing movement of said jaws to cable gripping and cable releasing positions upon movement of said pull member to extended and retracted positions respectively.

2. A cable gripping and pulling device comprising: a support, a pair of elongated jaws having opposed cable gripping faces and mounted on said support with said faces parallel to a longitudinal axis and for movement of said faces to and from said axis between cable gripping and cable releasing positions, a pull member carried by said support for longitudinal reciprocation on said axis between relatively extended and retracted positions, racks carried by said jaws medially of their length and projecting therefrom perpendicularly to said faces and away from said longitudinal axis so as to position said racks in a common transverse axis, and pinions journaled by said support and enmeshed with said racks and being connected to said pull member for causing movement of said jaws to cable gripping and cable releasing positions upon movement of said pull member to extended and retracted positions respectively.

3. A cable gripping and pulling device comprising: a support, a pair of jaws carried by said support for transverse reciprocation on said support to and from a medially disposed longitudinal axis between cable gripping and cable releasing positions, a pull member carried by said support for longitudinal reciprocation on said axis between relatively extended and retracted positions, a rack fixed to each of said jaws and projecting therefrom perpendicularly to said axis, pinions enmeshed with said racks and having shafts journaled for rotation by said support, and lever arms secured to said shafts and connected to said pull member for causing movement of said jaws to cable gripping and cable releasing positions upon movement of said pull member to extended and retracted positions respectively.

4. A cable gripping and pulling device comprising: a support, a pair of jaws carried by said support for transverse reciprocation to and from a medially disposed longitudinal axis between cable gripping and cable releasing positions, a pull member carried by said support for longitudinal reciprocation on said axis between relatively extended and retracted positions, racks carried by said jaws medially of their length and projecting therefrom perpendicularly to and away from said axis so as to position said racks in a common transverse axis, pinions enmeshed with said racks and having shafts journaled for rotation by said support in substantially equally spaced relation on opposite sides of said longitudinal axis, and lever arms secured to said shafts and extending therefrom towards said longitudinal axis and being connected to said pull member to effect rotary displacement of said shafts and pinions upon longitudinal reciprocation of said member to thereby cause movement of said jaws to cable gripping and cable releasing positions upon movement of said pull member to extended and retracted positions respectively.

5. A cable gripping and pulling device comprising: a housing having bottom and side and top walls defining an interior chamber and a longitudinally extending cable-receiving opening in said top wall, a pair of jaws mounted in said chamber on opposite sides of said opening and for transverse reciprocation towards and away from the longitudinal center axis thereof between cable gripping and cable releasing positions, racks carried by said jaws and projecting therefrom perpendicularly to and away from said axis, pinions mounted in said chamber and enmeshed with said racks and having shafts journaled in said bottom wall and projecting exteriorly therefrom, lever arms secured to said shafts and extending therefrom towards said longitudinal axis, and a pull member mounted on said bottom wall for longitudinal reciprocation on said longitudinal axis between relatively extended and retracted positions and being connected to said arms to effect displacement of said jaws to cable gripping and releasing positions upon movement of said pull member to extended and retracted positions respectively.

6. A cable gripping and pulling device comprising: a support, a pair of jaws carried by said support for transverse reciprocation to and from a medially disposed longitudinal axis between cable gripping and cable releasing positions, spring means biasing said jaws to cable engaging position, racks carried by said jaws and projecting therefrom perpendicularly to said axis, pinions journaled by said support and enmeshed with said racks for effecting reciprocation of said jaws, and a pull member carried by said support for longitudinal reciprocation on said axis between relatively extended and contracted positions and being connected to said pinions for displacing said jaws to cable gripping position upon movement of said pull members to extended position.

7. A cable gripping and pulling device comprising: a housing having bottom and side and top walls defining an interior chamber and a longitudinally extending cable-receiving opening in said top wall, a pair of jaws mounted in said chamber on opposite sides of said opening and for transverse reciprocation towards and away from the longitudinal center axis thereof between cable gripping and cable releasing positions, racks carried by said jaws and projecting therefrom perpendicularly to and away from said axis, pinions mounted in said chamber and enmeshed with said racks and having shafts journaled in said bottom wall and projecting exteriorly therefrom, lever arms secured to said shafts and extending therefrom towards said longitudinal axis, a pull member mounted on said bottom wall for longitudinal reciprocation on said longitudinal axis between relatively extended and retracted positions and being connected to said arms to effect rotary displacement of said shafts and pinions and movement of said jaws to cable gripping and releasing positions upon movement of said pull member to extended and retracted positions respectively, a handle mounted on said shafts exteriorly of said arms for carrying said device, and helical springs surrounding said shafts and secured thereto for normally urging said jaws to cable engaging position.

8. A cable gripping and pulling device comprising: a support, a pair of jaws carried by said support for transverse reciprocation to and from a medially disposed longitudinal axis between cable gripping and cable releasing positions, a pull member carried by said support for longitudinal reciprocation on said axis between relatively extended and retracted positions, means biasing the pull member toward an extended position, means for latching the pull member in retracted position, a rack fixed to each of said jaws and projecting therefrom perpendicularly to said axis, a pinion journaled by said support and enmeshed with each of said racks, and torque multiplying means connecting said pull member and pinions and causing movement of said jaws to cable gripping and cable releasing positions upon movement of said pull member to extended and retracted positions respectively.

9. A cable gripping and pulling device comprising: a support, a pair of elongated jaws having opposed cable gripping faces and mounted on said support with said faces parallel to a longitudinal axis and for movement of said faces to and from said axis between cable gripping and cable releasing positions, said jaws providing with said support a generally U shaped cable receiving opening, means for closing said opening, a pull member carried by said support for longitudinal reciprocation on said axis between relatively extended and retracted positions, racks carried by said jaws and projecting therefrom perpendicularly to said axis, and pinions journaled by said support and enmeshed with said racks and being connected to said pull member for causing movement of said jaws to cable gripping and cable releasing positions upon movement of said pull member to extended and retracted positions respectively.

10. A cable gripping and pulling device comprising: a support, a pair of jaws carried by said support for transverse reciprocation to and from a medially disposed longitudinal axis between cable gripping and cable releasing positions, said jaws providing with said support a generally U shaped cable receiving opening, means for closing said opening, a pull member carried by said support for longitudinal reciprocation on said axis between relatively extended and retracted positions, means biasing the pull member toward an extended position, means for latching the pull member in retracted position, a rack fixed to each of said jaws and projecting therefrom perpendicularly to said axis, a pinion journaled by said support and enmeshed with each of said racks, and torque multiplying means connecting said pull member and pinions and causing movement of said jaws to cable gripping and cable releasing positions upon movement of said pull member to extended and retracted positions respectively.

11. A cable gripping and pulling device comprising: a support, a pair of jaws carried by said support for transverse reciprocation to and from a medially disposed longitudinal axis between cable gripping and cable releasing positions, spring means biasing said jaws to cable engaging position, racks carried by said jaws and projecting therefrom perpendicularly to said axis, pinions journaled by said support and enmeshed with said racks for effecting reciprocation of said jaws, a pull member carried by said support for longitudinal reciprocation on said axis between relatively extended and contracted positions and being connected to said pinions for displacing said jaws to cable gripping position upon movement of said pull member to extended position, and means for moving the pull member into extended position.

12. A cable gripping and pulling device comprising: a support, a pair of jaws carried by said support for transverse reciprocation to and from a medially disposed longitudinal axis between cable gripping and cable releasing positions, a pull member carried by said support for longitudinal reciprocation on said axis between relatively extended and retracted positions, means biasing the pull member toward an extended position, means for latching the pull member in retracted position, a rack fixed to each of said jaws and projecting therefrom perpendicularly to said axis, a pinion journaled by said support and enmeshed with each of said racks, torque multiplying means connecting said pull member and pinions and causing movement of said jaws to cable gripping and cable releasing positions upon movement of said pull member to extended and retracted positions respectively, a first means for moving the pull member into extended position, and a second means for moving the pull member into contracted position.

References Cited in the file of this patent

UNITED STATES PATENTS

| 451,090 | Walter | Apr. 28, 1891 |
| 659,100 | Piercy | Oct. 2, 1900 |
| 1,510,176 | Knight | Sept. 30, 1924 |
| 1,749,869 | Baumbach | Mar. 11, 1930 |